US010796572B2

United States Patent
Farr et al.

(10) Patent No.: US 10,796,572 B2
(45) Date of Patent: Oct. 6, 2020

(54) AUTOMATED MAP ANOMALY DETECTION AND UPDATE

(71) Applicant: FORD GLOBAL TECHNOLOGIES, LLC, Dearborn, MI (US)

(72) Inventors: Zachary Farr, Detroit, MI (US); David Dean Smit, Ann Arbor, MI (US); Ivan Vukovic, Arlington Heights, IL (US); Raymond C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 15/651,666

(22) Filed: Jul. 17, 2017

(65) Prior Publication Data

US 2019/0019409 A1   Jan. 17, 2019

(51) Int. Cl.
| | | |
|---|---|---|
| *G08G 1/0967* | (2006.01) | |
| *G05D 1/02* | (2020.01) | |
| *G08G 1/0968* | (2006.01) | |
| *G08G 1/0962* | (2006.01) | |
| *G08G 1/0965* | (2006.01) | |
| *G01C 21/32* | (2006.01) | |
| *G06F 16/29* | (2019.01) | |
| *G01S 17/89* | (2020.01) | |
| *G01S 17/86* | (2020.01) | |
| *G01S 17/931* | (2020.01) | |

(52) U.S. Cl.
CPC ....... *G08G 1/096725* (2013.01); *G01C 21/32* (2013.01); *G05D 1/0214* (2013.01); *G05D 1/0248* (2013.01); *G05D 1/0274* (2013.01); *G05D 1/0276* (2013.01); *G05D 1/0287* (2013.01); *G08G 1/0965* (2013.01); *G08G 1/09626* (2013.01); *G08G 1/096775* (2013.01); *G08G 1/096811* (2013.01); *G01S 17/86* (2020.01); *G01S 17/89* (2013.01); *G01S 17/931* (2020.01); *G05D 2201/0212* (2013.01); *G06F 16/29* (2019.01)

(58) Field of Classification Search
CPC ............ G01C 21/32; G08G 1/096725; G08G 1/096775; G08G 1/096811; G08G 1/09626; G08G 1/0965; G05D 1/0274; G05D 1/0276; G05D 1/0214; G05D 1/0287; G05D 1/0248; G05D 2201/0212; G01S 17/86; G01S 17/931; G01S 17/89; G06F 16/29; G07C 5/008; G07C 5/0808
See application file for complete search history.

(56) References Cited

U.S. PATENT DOCUMENTS

| | | | |
|---|---|---|---|
| 2016/0357188 A1* | 12/2016 | Ansari | G05D 1/0212 |
| 2017/0052032 A1* | 2/2017 | Miksa | G01C 21/28 |

* cited by examiner

*Primary Examiner* — Russell Frejd
(74) *Attorney, Agent, or Firm* — Michael J. Spenner; Brooks Kushman P.C.

(57) ABSTRACT

A deviation hint is received from a vehicle by a server indicating an anomaly in vehicle sensor data compared to autonomous vehicle data maintained by the vehicle. A cause of the anomaly is identified per a view of the sensor data prior to through after the anomaly is received from the vehicle. Revised autonomous vehicle data is updated per the cause to a plurality of autonomous vehicles including the vehicle.

23 Claims, 4 Drawing Sheets

AUTOMATED MAP ANOMALY DETECTION AND UPDATE

TECHNICAL FIELD

Aspects of the disclosure generally relate to automated detection of anomalies in autonomous vehicle maps, and automated updating of the maps.

BACKGROUND

In a vehicle telematics system, a telematics control unit (TCU) may be used for various remote control services, such as over the air (OTA) software download, eCall, and turn-by-turn navigation. An autonomous vehicle is a vehicle that is capable of sensing its environment and navigating without human input. As compared to traditional telematics systems, autonomous vehicles may have greater data upload and download requirements.

SUMMARY

A vehicle includes autonomous vehicle sensors, a storage maintaining 3D prior maps and a road network definition file, and a processor. The processor is programmed to responsive to successful interpretation of an anomaly detected via raw sensor data received from the sensors, send the interpretation to an autonomous vehicle server, and responsive to unsuccessful interpretation of the anomaly, send a deviation hint indicating a road segment in which the anomaly is detected to the server.

A method includes receiving, by a server from a vehicle, a deviation hint indicating an anomaly in vehicle sensor data compared to autonomous vehicle data maintained by the vehicle; identifying, by the server, a cause of the anomaly per a view of the sensor data for a duration encompassing time during which the anomaly is received; and sending revised autonomous vehicle data updated per the cause to a plurality of autonomous vehicles.

A system includes a server programmed to receive, from a vehicle, a deviation hint indicating an anomaly in vehicle sensor data compared to autonomous vehicle data maintained by the vehicle; identify a cause of the anomaly per a view of the sensor data for a duration encompassing time during which the anomaly is received; and send revised autonomous vehicle data updated per the cause to a plurality of autonomous vehicles including the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
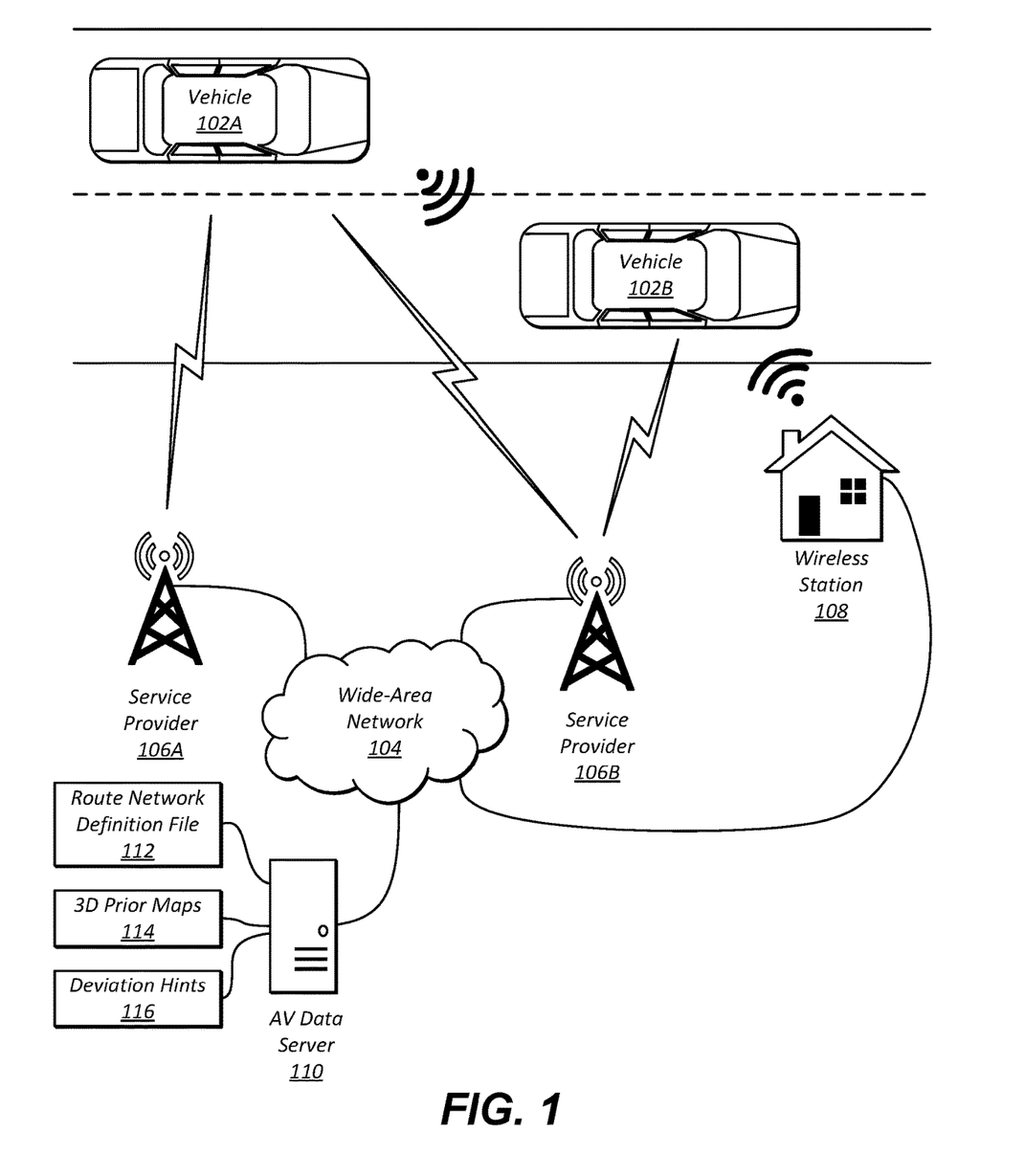
FIG. 1 illustrates an example system including autonomous vehicles in communication with an autonomous vehicle data server.

FIG. 1 illustrates an example system 100 including vehicles 102 in communication with an autonomous vehicle data server 110. As shown, the system 100 includes vehicles 102A and 102B (collectively 102) configured to wirelessly communicate with service providers 106A and 106B (collectively 106) and/or wireless stations 108 over a wide-area network 104. The autonomous vehicle data server 110 is also in communication with the wide-area network 104. The vehicles 102 may communicate with one another via Wi-Fi or other wireless communication protocols to allow a vehicle 102 to utilize the connectivity of others vehicles 102. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102, service providers 106, wireless stations 108, and or autonomous vehicle data servers 110.

The vehicles 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The wide-area network 104 may include one or more interconnected communication networks such as the Internet, a cable television distribution network, a satellite link network, a local area network, a wide area network, and a telephone network, as some non-limiting examples. By accessing the wide-area network 104, the vehicle 102 may be able to send outgoing data from the vehicle 102 to network destinations on the wide-area network 104, and receive incoming data to the vehicle 102 from network destinations on the wide-area network 104.

The service providers 106 may include system hardware configured to allow cellular transceivers of the vehicles 102 to access the communications services of the wide-area network 104. In an example, the service provider 106 may be a Global System for Mobile communication (GSM) cellular service provider. In another example, the service provider 106 may be a code division multiple access (CDMA) cellular service provider.

The wireless stations 108 may include system hardware configured to support local area network connections between the vehicles 102 and the wide-area network 104. In an example, the wireless stations 108 may support Dedicated Short Range Communications (DSRC) connections between the vehicles 102 and the wireless stations 108. In another example, the wireless stations 108 may support Wi-Fi connections between the vehicles 102 and the wireless stations 108. In yet another example, the wireless stations 108 may support 3GPP-based cellular Vehicle-to-Everything (C-V2X) connections between the vehicles 102 and the wireless stations 108. The wireless stations 108 may also provide connections between the wireless stations 108 and the wide-area network 104 thereby allowing connected vehicles 102 to access the wide-area network apart from use of the service providers 106.

Autonomous vehicles 102 function by utilizing vehicle sensor data and other road environmental data in combination with various driving algorithms. The autonomous vehicle data server 110 may include computing hardware configured to provide autonomous data services to the vehicles 102. In an example, the autonomous vehicle data server 110 may maintain autonomous vehicle data useful for the autonomous vehicles 102 in traversing routes along the roadways. This autonomous vehicle data may include route network definition files 112, 3D prior maps 114, and deviation hints 116. The vehicles 102 may receive autonomous vehicle data of the upcoming vehicle 102 environment from the autonomous vehicle data server 110. Using the autonomous vehicle data, the vehicles 102 may identify their specific placement along a route. The autonomous vehicles 102 may also be designed to upload sensed road environmental data to cause the autonomous vehicle data server 110 to update the autonomous vehicle data. Accordingly, the autonomous vehicle data server 110 may be further configured to update the autonomous vehicle data based on information provided to the autonomous vehicle data server 110 from the vehicles 102.

The route network definition files 112 may specify accessible road segments and provides information such as waypoints, stop sign locations, lane widths, speed limits, checkpoint locations, and parking spot locations. The route network definition files 112 may further include one or more free-travel areas defining perimeters in which travel is generally allowed, such as parking lots.

The 3D prior maps 114 may include 3D model information of the road segments or other traversable locations indicated by the route network definition files 112. In many examples, the 3D prior maps 114 are created by traversals down the road segments by instrumented vehicles 102 having LIDAR, camera (monaural, stereo, etc.) and/or other sensors useful in the generation of a 3D model of the roadway. Some examples of other sensors may include, for instance, lasers, radar, Global Positioning System (GPS), an inertial measurement unit (IMU), an altimeter, and wheel encoders.

The deviation hints 116 include data regarding roadway locations where anomalies were detected compared to the 3D prior maps 114. In an example, an autonomous vehicle 102 traversing a road segment may encounter an obstruction in the roadway that is not indicated on the 3D prior maps 114. As explained in further detail below, if the vehicle 102 is unable to identify the obstruction, the vehicle 102 may generate a deviation hint 116 to inform other vehicles 102 of the unknown obstruction.

Figure 2:
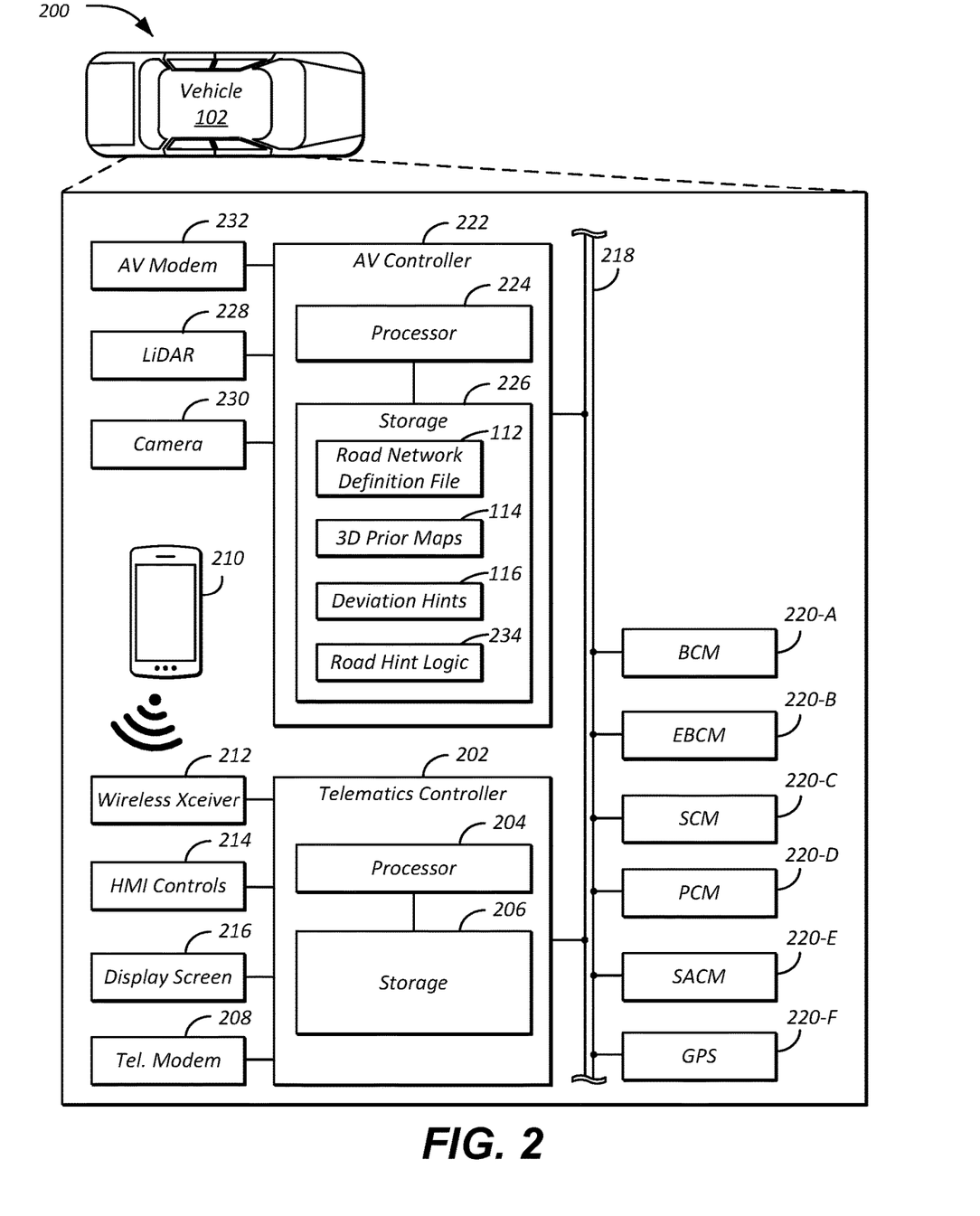
FIG. 2 illustrates an example diagram of the vehicle implementing autonomous vehicle features.

FIG. 2 illustrates an example diagram 200 of the vehicle 102 implementing autonomous vehicle features. The vehicle 102 includes a telematics controller 202 configured to communicate over the wide-area network 104. This communication may be performed using a telematics modem 208 of the telematics controller 202. Each vehicle 102 also includes an autonomous vehicle controller 222 additionally configured to communicate over the wide-area network 104 using a dedicated autonomous vehicle modem 232. While an example vehicle 102 is shown in FIG. 2, the example components as illustrated are not intended to be limiting. Indeed, the vehicle 102 may have more or fewer components, and additional or alternative components and/or implementations may be used.

The telematics controller 202 may be configured to support voice command and BLUETOOTH interfaces with the driver and driver carry-on devices (e.g., mobile devices 210), receive user input via various buttons or other controls, and provide vehicle status information to a driver or other vehicle 102 occupants. An example telematics controller 202 may be the SYNC system provided by FORD MOTOR COMPANY of Dearborn, Mich.

The telematics controller 202 may further include various types of computing apparatus in support of performance of the functions of the telematics controller 202 described herein. In an example, the telematics controller 202 may include one or more processors 204 configured to execute computer instructions, and a storage 206 medium on which the computer-executable instructions and/or data may be maintained. A computer-readable storage medium (also referred to as a processor-readable medium or storage 206) includes any non-transitory (e.g., tangible) medium that participates in providing data (e.g., instructions) that may be read by a computer (e.g., by the processor(s) 204). In general, a processor 204 receives instructions and/or data, e.g., from the storage 206, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc.

The telematics controller 202 may be configured to communicate with mobile devices 210 of the vehicle occupants. The mobile devices 210 may be any of various types of portable computing device, such as cellular phones, tablet computers, smart watches, laptop computers, portable music players, or other devices capable of communication with the telematics controller 202. As with the telematics controller 202, the mobile device 210 may include one or more processors configured to execute computer instructions, and a storage medium on which the computer-executable instructions and/or data may be maintained. In many examples, the telematics controller 202 may include a wireless transceiver 212 (e.g., a BLUETOOTH controller, a ZIGBEE transceiver, a Wi-Fi transceiver, etc.) configured to communicate with a compatible wireless transceiver of the mobile device 210. Additionally, or alternately, the telematics controller 202 may communicate with the mobile device 210 over a wired connection, such as via a USB connection between the mobile device 210 and a USB subsystem of the telematics controller 202. Additionally, or alternately, the telematics controller 202 may utilize the wireless transceiver 212 to communicate with Wi-Fi transceivers of wireless stations 108 within the vicinity of a roadway traversed by the vehicle 102. As yet another example, the telematics controller 202 may utilize the wireless transceiver 212 to communicate with other vehicles 102 traversing the roadway.

The telematics controller 202 may also receive input from human-machine interface (HMI) controls 214 configured to provide for occupant interaction with the vehicle 102. For instance, the telematics controller 202 may interface with one or more buttons or other HMI controls 214 configured to invoke functions on the telematics controller 202 (e.g., steering wheel audio buttons, a push-to-talk button, instrument panel controls, etc.). The telematics controller 202 may also drive or otherwise communicate with one or more displays 216 configured to provide visual output to vehicle occupants, e.g., by way of a video controller. In some cases, the display 216 may be a touch screen further configured to receive user touch input via the video controller, while in other cases the display 216 may be a display only, without touch input capabilities. In an example, the display 216 may be a head unit display included in a center console area of the vehicle 102 cabin. In another example, the display 216 may be a screen of a gauge cluster of the vehicle 102.

The telematics controller 202 may be further configured to communicate with other components of the vehicle 102 via one or more in-vehicle networks 218. The in-vehicle networks 218 may include one or more of a vehicle controller area network (CAN), an Ethernet network, and a media oriented system transfer (MOST), as some examples. The in-vehicle networks 218 may allow the telematics controller 202 to communicate with other vehicle 102 systems, such as a body control module (BCM) 220-A, an electronic brake control system (EBCM) 220-B, a steering control system (SCM) 220-C, a powertrain control system (PCM) 220-D, a safety control system (SACM) 220-E, and a global positioning system (GPS) 220-F. As depicted, the controllers 220 are represented as discrete modules and systems. However, the controllers 220 may share physical hardware, firmware, and/or software, such that the functionality from multiple controllers 220 may be integrated into a single module 220, and that the functionality of various such controllers 220 may be distributed across a plurality of controllers 220.

The BCM 220-A may be configured to support various functions of the vehicle 102 related to control of current loads feeding off the vehicle 102 battery. Examples of such current loads include, but are not limited to, exterior lighting, interior lighting, heated seats, heated windshield, heated backlight, and heated mirrors. Additionally, the BCM 220-A may be configured to manage vehicle 102 access functions, such as keyless entry, remote start, and point of access status verification (e.g., closure status of the hood, doors and/or trunk of the vehicle 102).

The EBCM 220-B may be configured to control braking functions of the vehicle 102. In some examples, the EBCM 220-B may be configured to receive signal information from vehicle wheel sensors and/or drivetrain differentials, and manage anti-lock and anti-skid brake functions through control of brake line valves that adjust brake pressure from the master cylinder.

The SCM 220-C may be configured to aid in vehicle steering by augmenting or counter-acting steering effort provided to the vehicle 102 wheels. In some cases, the augmented steering effort may be provided by a hydraulic steering assist configured to provide controlled energy to the steering mechanism, while in other cases the augmented steering effort may be provided by an electric actuator system.

The PCM 220-D may be configured to perform engine control and transmission control functions for the vehicle 102. With respect to engine control, the PCM 220-D may be configured to receive throttle input and control actuators of the vehicle engine to set air/fuel mixture, ignition timing, idle speed, valve timing, and other engine parameters to ensure optimal engine performance and power generation.

With respect to transmission control, the PCM 220-D may be configured to receive inputs from vehicle sensors such as wheel speed sensors, vehicle speed sensors, throttle position, transmission fluid temperature, and determine how and when to change gears in the vehicle 102 to ensure adequate performance, fuel economy, and shift quality.

The SACM 220-E may be configured to provide various functions to improve the stability and control of the vehicle 102. As some examples, the SACM 220-E may be configured to monitor vehicle sensors (e.g., steering wheel angle sensors, yaw rate sensors, lateral acceleration sensors, wheel speed sensors, etc.), and control the BCM 220-A, SCM 220-C, and/or PCM 220-D. As some possibilities, the SACM 220-E may be configured to provide throttle input adjustments, steering angle adjustments, brake modulation, and all-wheel-drive power split decision-making over the vehicle bus 218 to improve vehicle stability and controllability. It should be noted that in some cases, the commands provided by the SACM 220-E may override other command input provided by the driver or by the autonomous vehicle controller 222.

The GPS 220-F configured to provide vehicle 102 current location and heading information, and various other vehicle controllers 220 configured to cooperate with the telematics controller 202.

The autonomous vehicle controller 222 may include and/or communicate with various types of computing apparatus to facilitate the performance of the autonomous vehicle 102 functions. In an example, the autonomous vehicle controller 222 may include one or more processors 224 configured to execute computer instructions, and a storage medium 226 on which the computer-executable instructions (e.g., autonomous vehicle logic 234 as discussed in more detail below) and/or autonomous vehicle data (e.g., road network definition files 112, 3D prior maps 114, deviation hints 116, etc.) may be maintained.

The autonomous vehicle controller 222 may receive input from various sensors. In an example, the autonomous vehicle controller 222 may be in communication with Lidar sensors 228. In other example, the autonomous vehicle controller 222 may additionally or alternately be in communication with laser, radar, sonar, or other types of distance and/or obstacle sensors. The autonomous vehicle controller 222 may be in communication with one or more camera 230 devices configured to capture information regarding the surroundings of the vehicle 102.

The autonomous vehicle controller 222 may further utilize an autonomous vehicle modem 232 to communicate data (e.g., autonomous vehicle data) between the vehicle 102 and the autonomous vehicle data server 110 accessible over the wide-area network 104. In some examples, the autonomous vehicle modem 232 may be configured to communicate with the same service provider 106 providing communications services to the telematics modem 208. In other examples, autonomous vehicle modem 232 may be configured to communicate with a different service provider 106 than the service provider 106 providing communications services to the telematics modem 208. In one example, the telematics modem 208 may access the wide-area network 104 using the service provider 106A shown in FIG. 1, while the autonomous vehicle modem 232 may access the wide-area network 104 using the service provider 106B shown in FIG. 1.

The autonomous vehicle controller 222 may utilize driving algorithms to command braking, steering, acceleration, and other functions of the vehicle 102. These algorithms may be stored to the storage 226 and executed by the one or more processors 224 of the autonomous vehicle controller 222 to command the vehicle 102. The autonomous vehicle controller 222 may accordingly command the vehicle 102 based on inputs such as the road network definition file 112, 3D prior maps 114, and deviation hints 116 received from the autonomous vehicle data server 110, sensor input received from the Lidar sensors 228 (or other sensors), image input received from the one or more camera 230 devices, and data from the various controllers 220 received over the vehicle bus 218.

One such algorithm executed by the autonomous vehicle controller 222 is the road hint logic 234. As the autonomous vehicle 102 is traversing its route, the road hint logic 234 causes the vehicle 102 to continually compare a current 3D view identified by the vehicle 102 via the Lidar sensors 228, camera 230, and/or other sensors to a previously-loaded 3D prior map 114 maintained in the storage 226.

If road hint logic 234 identifies a difference, the road hint logic 234 may cause the vehicle 102 to send an anomaly discovery view to the autonomous vehicle data server 110. In an example, the anomaly discovery view includes a snapshot of data prior to and after anomaly discovery, e.g., from fifteen seconds prior to the anomaly through fifteen seconds post the anomaly. The anomaly discovery view data may include data from the Lidar sensors 228 and camera 230, and/or from other autonomous vehicle sensors of the vehicle 102. The anomaly discovery view data may be sent from the vehicle 102 to the autonomous vehicle data server 110 using the autonomous vehicle modem 232, or in other cases additionally or alternately using the telematics modem 208.

The autonomous vehicle data server 110 may receive the updated data, and may update the version of the 3D prior map 114 stored at the autonomous vehicle data server 110 using the new information from the autonomous vehicle 102. The autonomous vehicle data server 110 may further send the 3D prior map 114, as updated, to other autonomous vehicles 102 in the vicinity of the discovered anomaly, e.g., that are taking a route along the same road segment as the autonomous vehicle 102 reporting the anomaly.

When these files are uploaded and downloaded, they create a considerable burden on communication resources of the vehicles 102 and of the wide-area network 104. Moreover, 3D prior maps 114 in many vehicles 102 are updated by a hard drive swap or Ethernet download at a service area when the autonomous vehicle 102 goes back for service. This results in the autonomous vehicle 102 lacking an up-to-date 3D prior map 114 of anomalies until the autonomous vehicle 102 can return to the service area, which could be many hours. However, autonomous vehicles 102 that lack the up-to-date 3D prior map 114 may be unable to complete dynamic driving tasks.

Figure 3:
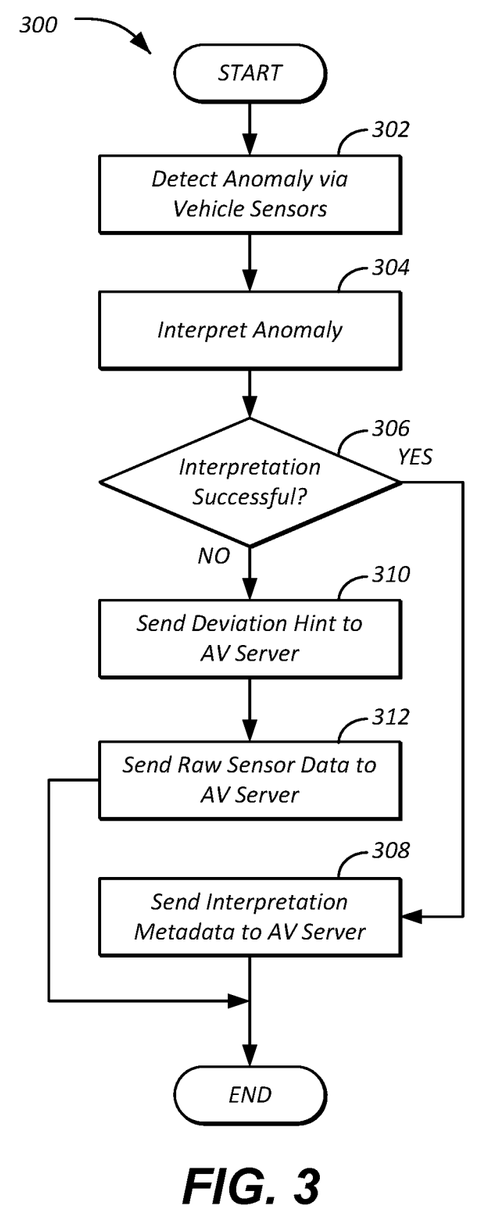
FIG. 3 illustrates an example process for detection of anomalies by vehicles.
Figure 4:
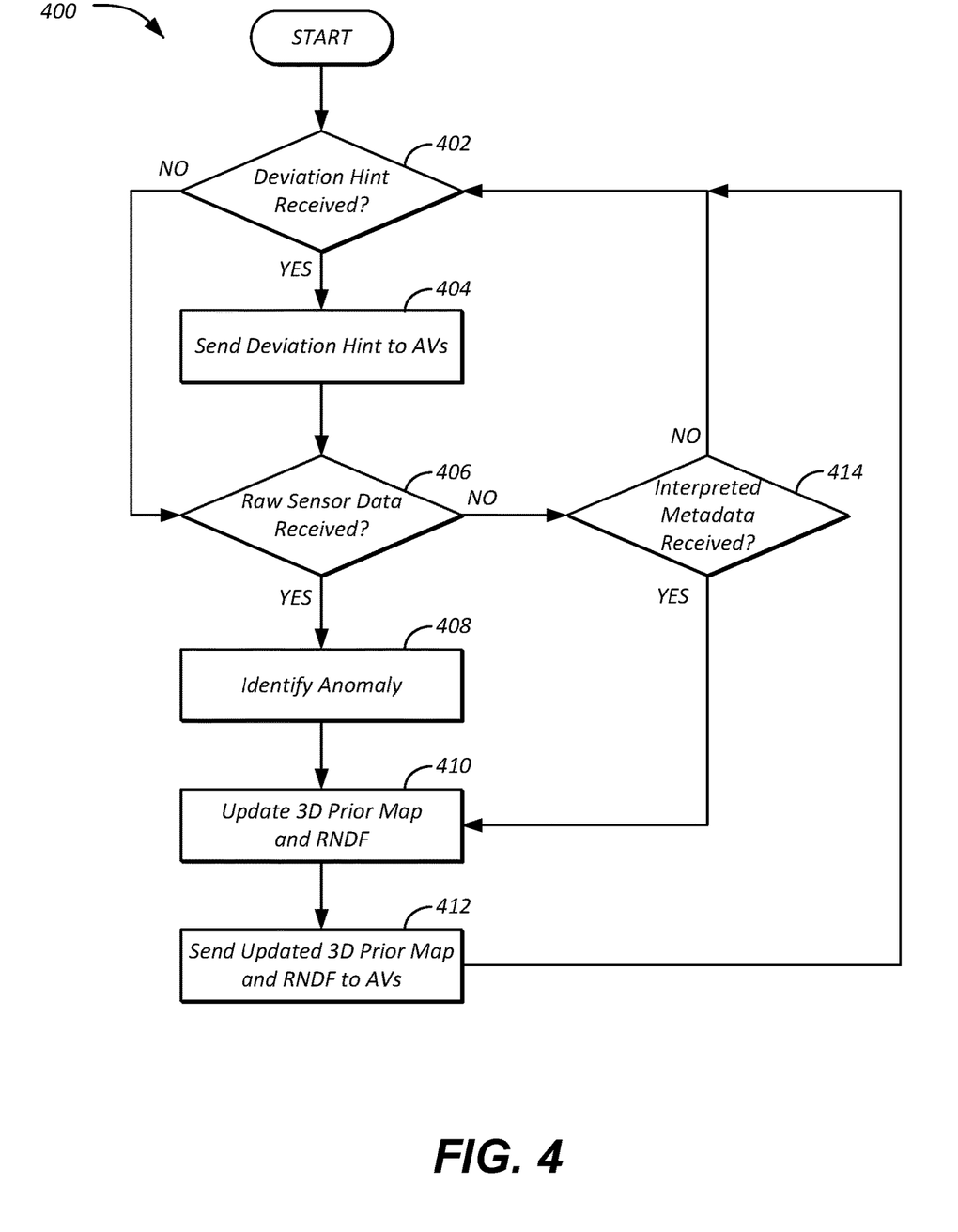
FIG. 4 illustrates an example process for performing autonomous driving by a vehicle.
Figure 5:
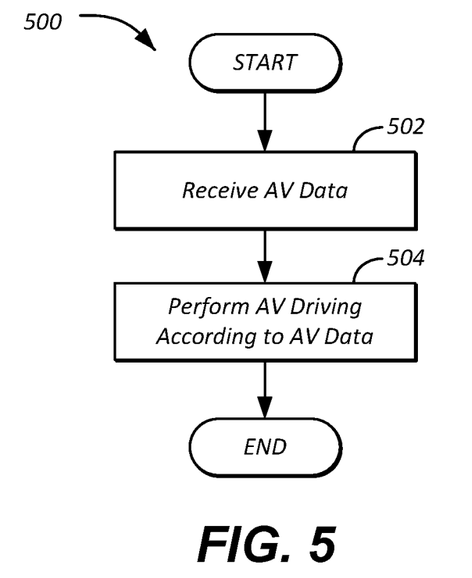
FIG. 5 illustrates an example process for updating autonomous vehicle data by the autonomous vehicle data server based on detected anomalies.

As explained in further detail with regard to the processes 300, 400, and 500, the system 100 avoids using costly wireless links to send large anomaly updated and at the same time avoids having autonomous vehicles 102 wait until they return to a depot to receive an updated 3D prior map 114.

Responsive to detection of an anomaly, the autonomous vehicle 102 attempts to identify the object that caused the anomaly detection (e.g. the autonomous vehicle 102 interpreting the raw camera data of a stop sign into metadata indicating a stop sign). If the anomaly can be detected, the metadata is then sent to the autonomous vehicle data server 110 together with the location of the anomaly and the detected cause. This information is processed by the autonomous vehicle data server 110 and disseminated to other autonomous vehicles 102 in the operational area to allow the other autonomous vehicles 102 to better perform the autonomous driving tasks.

If, however, the cause of the anomaly cannot be identified by the autonomous vehicle 102, a deviation hint 116 is sent to the autonomous vehicle data server 110 by the autonomous vehicle 102. The deviation hint 116 may include information such as positional coordinates of the anomaly (e.g., GPS coordinates), indicators such as caution or slow down, and coordinates of the 3D prior map 114 where the discrepancy with the 3D prior map 114 was detected. The autonomous vehicle 102 may further send the entire sensor dataset when possible, allowing the autonomous vehicle data server 110 to further processes the area of the 3D prior map 114 to better determine a possible cause for the anomaly. The deviation hint 116 of the anomaly may also be sent by the autonomous vehicle data server 110 to other autonomous vehicles 102 that are heading into the area where the anomaly has been detected to inform those autonomous vehicles 102 that there is an issue, even if the exact issue is not initially apparent form the deviation hint 116.

FIG. 3 illustrates an example process 300 for detection of anomalies by vehicles 102. In an example, the process 300 may be performed by the autonomous vehicle controller 222 executing the road hint logic 234.

At 302, the autonomous vehicle controller 222 detects an anomaly using one or more sensors of the vehicle 102. In an example, the autonomous vehicle controller 222 may execute the road hint logic 234 to track progress of the vehicle 102 along a route using the 3D prior maps 114 and data from Lidar 228 camera 230 and/or other sensors. During the traversal of the route, the road hint logic 234 may identify one or more 3D features of the sensor data that fails to match with the 3D prior maps 114 and location of the vehicle 102. Such a situation may be caused, for instance, by a temporary feature such as stalled vehicle 102 in the road, or by a permanent feature such as a change in roadway structure. In such a situation, the road hint logic 234 may identify an anomaly as the 3D prior maps 114 does not match the vehicle 102 data received by sensors of the vehicle 102.

At operation 304, the autonomous vehicle controller 222 interprets the detected anomaly. In an example, the autonomous vehicle controller 222 may execute the road hint logic 234 to identify a cause of the anomaly. For instance, the road hint logic 234 may compare the anomaly to signatures of predefined anomaly types, such as lane closure signs, disabled vehicles, emergency vehicles, etc. In another example, the autonomous vehicle controller 222 may utilize a neural network trained on various types of road sensor data to allow the autonomous vehicle controller 222 to identify the anomaly in the sensor data.

At 306, the autonomous vehicle controller 222 determines whether interpretation of the anomaly was successful. In an example, if the anomaly matches one of the predefined signatures or the neural network matches the sensors data, then the autonomous vehicle controller 222 has successfully interpreted the anomaly. If so, control passes to operation 308. Otherwise, control passes to operation 310.

At operation 308, the autonomous vehicle controller 222 sends the interpreted metadata to the autonomous vehicle data server 110. Accordingly, in instances in which the road hint logic 234 identifies the cause of the anomaly, metadata descriptive of the identified anomaly can be sent to the autonomous vehicle data server 110, without requiring the raw sensor data to be sent to the autonomous vehicle data server 110. After operation 308, the process 300 ends.

The autonomous vehicle controller 222 sends a deviation hint 116 to the autonomous vehicle data server 110 at 310. In an example, the deviation hint 116 may specify positional coordinates of the anomaly (e.g., GPS coordinates), indicators such as caution or slow down, and coordinates of the 3D prior map 114 where the discrepancy with the 3D prior map 114 was detected. The autonomous vehicle controller 222 may send the deviation hint 116 to the autonomous vehicle data server 110 using the autonomous vehicle modem 232, or in other cases additionally or alternately using the telematics modem 208.

At 312, the autonomous vehicle controller 222 sends the raw sensor data to the autonomous vehicle data server 110. In an example, the autonomous vehicle controller 222 may send the raw sensor data over time to the autonomous vehicle data server 110. As the deviation hint 116 has already been sent to the autonomous vehicle data server 110, the timing of the transfer of the raw sensor data is less critical than were the raw sensor data required for the system 100 to identify that there is a potential anomaly. After operation 312, the process 300 ends.

FIG. 4 illustrates an example process 400 for updating autonomous vehicle data by the autonomous vehicle data server 110 based on detected anomalies. In an example, the process 500 may be performed by the autonomous vehicle data server 110.

At operation 402, the autonomous vehicle data server 110 determines whether a deviation hint 116 was received. In an example, the autonomous vehicle data server 110 may receive the deviation hint 116 from one of the vehicles 102 as discussed above with respect to operation 310 of the process 300. If so, control passes to operation 404. Otherwise, control passes to operation 406.

At 404, the autonomous vehicle data server 110 sends the deviation hint 116 to autonomous vehicles 102. In an example, the autonomous vehicle data server 110 may receive information indicative of the current locations of the autonomous vehicles 102 and may send the deviation hint 116 to vehicles 102 within a predefined geographic proximity to the location updated by the deviation hint 116 or within the same postal code, state, or other region as the location of the deviation hint 116. In another example, the autonomous vehicle data server 110 may receive information indicative of intended routes for the autonomous vehicles 102, and based on the information, the autonomous vehicle data server 110 may send the deviation hint 116 to vehicles 102 that will traverse the road segment updated by the deviation hint 116. In yet a further example, the autonomous vehicle data server 110 sends the deviation hint 116 to all the vehicles 102.

The autonomous vehicle data server 110 determines whether raw sensor data was received at 406. In an example, the autonomous vehicle data server 110 may receive the deviation hint 116 from one of the vehicles 102 as discussed above with respect to operation 312 of the process 300. If so, control passes to operation 408. If not, control passes to operation 414.

At 408, the autonomous vehicle data server 110 identifies the anomaly. In an example, the autonomous vehicle data server 110 may have greater computer and data storage capabilities as compared to the vehicle 102, and may accordingly utilize more sophisticated techniques to identify the nature of the anomaly than could be performed at the vehicle 102. These techniques may include, similar as discussed above with regard to operation 304, comparison of the anomaly to signatures of predefined anomaly type and/or use of trained neural networks to identify the anomaly.

At operation 410, the autonomous vehicle data server 110 updates the route network definition files 112 and/or 3D prior maps 114. In an example, the autonomous vehicle data server 110 may automatically make changes to the route network definition files 112 and/or 3D prior maps 114 to include the identified anomaly in an updated version of the route network definition files 112 and/or 3D prior maps 114.

At operation 412, the autonomous vehicle data server 110 sends the route network definition files 112 and/or 3D prior maps 114 to the autonomous vehicles 102. The updated autonomous vehicle data may be sent to the vehicles 102 according to one or more of the approaches indicated above with respect to operation 404. After operation 412, control returns to operation 402.

The autonomous vehicle data server 110 determines whether interpreted metadata was received at 414. In an example, the vehicle 102 may have sent an interpretation of the anomaly to the autonomous vehicle data server 110 as discussed above with respect to operation 308. If so, control passes to operation 410 to update the autonomous vehicle data using the vehicle 102 of the anomaly. If not, control returns to operation 402.

FIG. 5 illustrates an example process 500 for performing autonomous driving by a vehicle 102. In an example, the process 500 may be performed by the autonomous vehicle controller 222.

At 502, the autonomous vehicle controller 222 receives autonomous vehicle data from the autonomous vehicle data server 110. In an example, the autonomous vehicle data may be received by the vehicle 102 as discussed above with regard to operations 404 or 412 of the process 400.

At operation 504, the autonomous vehicle controller 222 performs autonomous vehicle driving according to the autonomous vehicle data. In an example, the autonomous vehicle controller 222 utilizes the received autonomous vehicle data to perform one or more autonomous driving operations. For instance, if a deviation hint 116 is received from the autonomous vehicle server 110 at operation 502, the vehicle 102 may adjust its route to avoid the road segment having an anomaly implicated by the deviation hint 116. After operation 504, the process 500 ends.

Computing devices described herein, such as the autonomous vehicle controller 222 and autonomous vehicle data server 110, generally include computer-executable instructions where the instructions may be executable by one or more computing devices such as those listed above. Computer-executable instructions, such as those of the road hint logic 234, may be compiled or interpreted from computer programs created using a variety of programming languages and/or technologies, including, without limitation, and either alone or in combination, Java™, C, C++, C #, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   autonomous vehicle sensors;
   a storage maintaining 3D prior maps and a road network definition file; and
   a processor programmed to
      detect an anomaly in raw sensor data received from the autonomous vehicle sensors by identifying one or more 3D features of the raw sensor data that fail to match with the 3D prior maps for a location of the vehicle,
      execute road hint logic to attempt to interpret a cause of the anomaly,
      responsive to successful interpretation of the anomaly by the road hint logic, send the interpretation to an autonomous vehicle server, the interpretation indicating the cause of the anomaly, and
      responsive to unsuccessful interpretation of the anomaly by the road hint logic, send a deviation hint indicating a road segment of the road network definition file in which the anomaly is detected to the server, the cause of the anomaly not being indicated by the deviation hint.

2. The vehicle of claim 1, wherein the processor is further programmed to send the raw sensor data to the server after sending the deviation hint.

3. The vehicle of claim 2, wherein the raw sensor data includes a snapshot of data collected from the autonomous vehicle sensors for a period of time beginning prior to the anomaly through after the anomaly.

4. The vehicle of claim 3, wherein the snapshot of data includes data fifteen seconds prior to the anomaly through fifteen seconds post the anomaly.

5. The vehicle of claim 1, wherein the autonomous vehicle sensors include a lidar sensor and a camera, and the raw sensor data includes data from the lidar sensor and from the camera.

6. The vehicle of claim 1, wherein the autonomous vehicle sensors include one or more of lasers, radar, a global positioning system location device, an inertial measurement unit, an altimeter, and wheel encoders.

7. The vehicle of claim 1, wherein the processor is further programmed to:
   receive a second deviation hint from the server per a second anomaly detected via second raw sensor data received from second sensors of a second vehicle; and
   update one or more autonomous vehicle driving maneuvers per the second deviation hint.

8. The vehicle of claim 7, wherein the second deviation hint indicates a road segment of the road network definition file in which the second anomaly is detected, and the processor is further programmed to update the one or more autonomous vehicle driving maneuvers to avoid the road segment in which the second anomaly is detected.

9. The vehicle of claim 1, wherein the deviation hint specifies positional coordinates of the anomaly and coordinates of the 3D prior map where the discrepancy with the 3D prior map was detected.

10. The vehicle of claim 1, wherein the road hint logic is configured to cause the processor to compare the anomaly to signatures of predefined anomaly types, the predefined anomaly types including one or more of lane closure signs, disabled vehicles, or emergency vehicles.

11. The vehicle of claim 1, wherein the processor is programmed to utilize a neural network trained on road sensor data to identify the anomaly in the sensor data.

12. A method comprising:
   receiving, by a server from a vehicle, a deviation hint indicating an anomaly in vehicle sensor data compared to autonomous vehicle data maintained by the vehicle, the anomaly being identified by the vehicle responsive to the vehicle identifying one or more 3D features of the raw sensor data that fail to match with 3D prior maps for a location of the vehicle, the deviation hint being sent by the vehicle responsive to detection of the anomaly;
   sending, to a plurality of other vehicles in vicinity of the vehicle the deviation hint to inform the other vehicles that the anomaly has been detected in the vehicle sensor data, despite a cause underlying the anomaly not being identified by the deviation hint;
identifying, by the server, the cause of the anomaly per a view of the vehicle sensor data for a duration encompassing time during which the anomaly is received; and
sending revised autonomous vehicle data updated per the cause to the plurality of other vehicles.

13. The method of claim 12, further comprising receiving the view of the sensor data from the vehicle responsive to the vehicle unsuccessfully identifying the cause of the anomaly.

14. The method of claim 12, further comprising utilizing a neural network trained on a plurality of causes of sensor data anomalies for identifying the anomaly in the sensor data.

15. The method of claim 12, further comprising comparing the anomaly to signatures of predefined anomaly types, wherein the predefined anomaly types include one or more of lane closure signs, disabled vehicles, and emergency vehicles.

16. The method of claim 12, wherein the duration includes sensor data fifteen seconds prior to the anomaly through fifteen seconds post the anomaly.

17. The method of claim 12, wherein the vehicle sensor data includes data from a lidar sensor of the vehicle and from a camera of the vehicle.

18. A system comprising:
a server programmed to
receive, from a vehicle, a deviation hint indicating an anomaly in vehicle sensor data compared to autonomous vehicle data maintained by the vehicle, the anomaly being identified by the vehicle responsive to the vehicle identifying one or more 3D features of the raw sensor data that fail to match with 3D prior maps for a location of the vehicle, the deviation hint being sent by the vehicle responsive to detection of the anomaly;
send, to a plurality of other vehicles in vicinity of the vehicle, the deviation hint to inform the other vehicles that the anomaly has been detected in the vehicle sensor data, despite a cause underlying the anomaly not being identified by the deviation hint;
identify the cause of the anomaly per a view of the vehicle sensor data for a duration encompassing time during which the anomaly is received; and
send revised autonomous vehicle data updated per the cause to the plurality of other vehicles and the vehicle.

19. The system of claim 18, wherein the view of the sensor data is received from the vehicle responsive to the vehicle unsuccessfully identifying the cause of the anomaly.

20. The system of claim 18, wherein the server is further programmed to utilize a neural network trained on a plurality of causes of sensor data anomalies for identifying the anomaly in the sensor data.

21. The system of claim 18, wherein the server is further programmed to compare the anomaly to signatures of predefined anomaly types, and wherein the predefined anomaly types include one or more of lane closure signs, disabled vehicles, and emergency vehicles.

22. The system of claim 18, wherein the duration includes sensor data fifteen seconds prior to the anomaly through fifteen seconds post the anomaly.

23. The system of claim 18, wherein the vehicle sensor data includes data from a lidar sensor of the vehicle and from a camera of the vehicle.

* * * * *